US011010664B2

(12) United States Patent
Kurach et al.

(10) Patent No.: US 11,010,664 B2
(45) Date of Patent: May 18, 2021

(54) AUGMENTING NEURAL NETWORKS WITH HIERARCHICAL EXTERNAL MEMORY

(71) Applicant: DeepMind Technologies Limited, London (GB)

(72) Inventors: Karol Piotr Kurach, Zurich (CH); Marcin Andrychowicz, London (GB)

(73) Assignee: DeepMind Technologies Limited, Mountain View, CA (US)

( * ) Notice: Subject to any disclaimer, the term of this patent is extended or adjusted under 35 U.S.C. 154(b) by 1136 days.

(21) Appl. No.: 15/396,000

(22) Filed: Dec. 30, 2016

(65) Prior Publication Data
US 2017/0228643 A1 Aug. 10, 2017

Related U.S. Application Data

(60) Provisional application No. 62/291,942, filed on Feb. 5, 2016.

(51) Int. Cl.
*G06N 3/08* (2006.01)
*G06N 3/04* (2006.01)
(Continued)

(52) U.S. Cl.
CPC ............. *G06N 3/08* (2013.01); *G06F 3/0604* (2013.01); *G06F 3/0653* (2013.01);
(Continued)

(58) Field of Classification Search
CPC ............ G06Q 10/04; G06N 3/04; G06N 3/08; G06N 20/00; G06F 17/11
(Continued)

(56) References Cited

U.S. PATENT DOCUMENTS 5,263,124 A * 11/1993 Weaver ............... G06K 9/6282
382/159
5,909,681 A * 6/1999 Passera ............... G06F 9/5027
(Continued)

OTHER PUBLICATIONS

Graves et al.—"Neural Turing Machines"—2014—https://arxiv.org/abs/1410.5401 (Year: 2014).*
(Continued)

*Primary Examiner* — Viker A Lamardo
(74) *Attorney, Agent, or Firm* — Fish & Richardson P.C.

(57) ABSTRACT

Systems, methods, devices, and other techniques are disclosed for using an augmented neural network system to generate a sequence of outputs from a sequence of inputs. An augmented neural network system can include a controller neural network, a hierarchical external memory, and a memory access subsystem. The controller neural network receives a neural network input at each of a series of time steps processes the neural network input to generate a memory key for the time step. The external memory includes a set of memory nodes arranged as a binary tree. To provide an interface between the controller neural network and the external memory, the system includes a memory access subsystem that is configured to, for each of the series of time steps, perform one or more operations to generate a respective output for the time step. The capacity of the neural network system to account for long-range dependencies in input sequences may be extended. Also, memory access efficiency may be increased by structuring the external memory as a binary tree.

24 Claims, 5 Drawing Sheets

(51) Int. Cl.
 G06F 3/06 (2006.01)
 G06F 12/128 (2016.01)
 G06N 3/063 (2006.01)
(52) U.S. Cl.
 CPC ......... G06F 3/0673 (2013.01); G06N 3/0445 (2013.01); *G06F 12/128* (2013.01); *G06N 3/063* (2013.01)
(58) Field of Classification Search
 USPC .......................................................... 706/19
 See application file for complete search history.

(56) References Cited

U.S. PATENT DOCUMENTS

| | | | | |
|---|---|---|---|---|
| 8,856,138 | B1* | 10/2014 | Neubeck | G06F 16/90344 707/745 |
| 2002/0107860 | A1* | 8/2002 | Gobeille | G06F 16/9027 |
| 2003/0123397 | A1* | 7/2003 | Lee | H04L 45/742 370/256 |
| 2003/0185396 | A1* | 10/2003 | Asano | H04L 9/0822 380/277 |
| 2006/0059179 | A1* | 3/2006 | Asano | H04L 9/0836 |
| 2007/0133806 | A1* | 6/2007 | Asano | H04L 9/0836 380/277 |
| 2011/0246503 | A1* | 10/2011 | Bender | G06F 9/546 707/769 |
| 2013/0235049 | A1* | 9/2013 | Karras | G06T 1/20 345/505 |
| 2017/0244567 | A1* | 8/2017 | Smeets | H04L 9/3247 |

OTHER PUBLICATIONS

Zaremba et al.—"Reinforcement Learning Neural Turing Machines—Revised"—2016—https://arxiv.org/abs/1505.00521 (Year: 2016).*
Carmantini et al.—"Turing Computation with Recurrent Artificial Neural Networks"—2015—https://arxiv.org/abs/1511.01427 (Year: 2015).*
Zhang et al.—"Structured Memory for Neural Turing Machines"—2015—https://arxiv.org/abs/1510.03931 (Year: 2015).*
EP Office Action in European Appln No. 16828904.9, dated Oct. 14, 2019, 7 pages.
Andrychowicz et al. "Learning Efficient Algorithms with Hierarchical Attentive Memory," ARXIV.org, Cornell University Library, 201 Olin Library Cornell University Ithaca, NY 14853, Feb. 10, 2016, 10 pages.
Bandanau et al. "Neural machine translation by jointly learning to align and translate," arXiv preprint arXiv, 2014, 15 pages.
Graves et al. "Neural turing machines," arXiv preprint arXiv, Oct. 20, 2014, 26 pages.
Grefenstette et al. "Learning to transduce with unbounded memory," Advances in Neural Information Processing Systems, 2015, 9 pages.
Hockreiter et al. "Long short-term memory," Neural computation, 9(8), 1997, 46 pages.
International Search Report and Written Opinion in the International Application No. PCT/US2016/069571, dated Apr. 6, 2017, 16 pages.
Joulin et al. "Inferring algorithmic patters with stack-augmented recurrent nets," arXiv preprint ar Xiv: 1503.01007, Jun. 1, 2015, 9 pages.
Kaiser et al. "Neural gpus learn algorithms," arXiv preprint arXiv:1511.08228, 2015, 9 pages.
Kalchbrenner et al. "Grid long short-term memory," arXiv preprint arXiv1507.01526, 2015, 15 pages.
Kingma et al. "Adam: a method for stochastic optimization," arXiv preprint arXic1412.6980, 2014, 15 pages.
Kurach et al. "Neural random-access machines," arXiv preprint arXiv1511.06392, 2015, 17 pages.
Li et al. "Gated graph sequence neural networks," arXiv preprint arXiv1511.05493, 2015, 20 pages.
Morin et al. "Hierarchical probabilistic neural network language model," Aistats v.5 Citeseer, 2005, 7 pages.
Nair et al. "Rectified linear units improve restricted boltzmann machines," Proceedings of the $27^{th}$ International Conference on Machine Learning (ICML-10), 2010, 8 pages.
Pascanu et al. "Understanding the exploding gradient problem," Computing Research Repository (CoRR) abs/1211.5063, 2012, 11 pages.
Reed et al. "Neural programmer-interpreters," arXiv preprint arXiv:1511.06279, 2015, 13 pages.
Schulman et al. "Gradient estimation using stochastic computation graphs," Advances in Neural Information Processing Systems, 2015, 9 pages.
Srivastava et al. "Highway networks," arXiv preprint arXiv:1505.00387, 2015, 6 pages.
Sukhbaatar et al. "End-to-end memory networks," arXiv preprint arXiv:1503.08895, 2015, 9 pages.
Sutskever et al. "Sequence to sequence learning with neural networks," Advances in neural information processing systems, 2014, 9 pages.
Vinyals et al. "Pointer networks," arXiv preprint arXiv1506.03134, 2015, 9 pages.
Vinyals et al. "Show and tell: A neural image caption generator," arXiv preprint arXiv 1411.4555, 2014, 9 pages.
Weston et al. "Memory networks," arXiv preprint arXiv1410.3916, 2014, 15 pages.
Williams. "Simple statistical gradient-following algorithms for connectionist reinforcement learning," Machine learning, 8(3-4) 1992, 28 pages.
Zaremba et al. "Learning simple algorithms from examples," arXiv preprint arXiv:1511.07275, 2015, 12 pages.
Zaremba et al. "Reinforcement learning neural turing machines," arXiv preprint arXiv 1505.00521, 2015, 13 pages.
Zhao et al. "Self-Adaptive Hierarchical Sentence Model," arXiv preprint arXiv1504.05070, Apr. 27, 2015, 8 pages.
Zhu et al. "Long Short-Term Memory Over Tree Structures," arXiv preprint arXiv 1503.04881, Mar. 16, 2015, 9 pages.
International Preliminary Report on Patentability issued in International Application No. PCT/US2016/069571, dated Aug. 16, 2018, 9 pages.

* cited by examiner

AUGMENTING NEURAL NETWORKS WITH HIERARCHICAL EXTERNAL MEMORY

CROSS-REFERENCE TO RELATED APPLICATIONS

This application claims priority to U.S. Provisional Application No. 62/291,942, filed on Feb. 5, 2016. The disclosure of the prior application is considered part of and is incorporated by reference in its entirety in the disclosure of this application.

BACKGROUND

This specification relates to neural network architectures.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Some neural networks are recurrent neural networks. A recurrent neural network is a neural network that receives an input sequence and generates an output sequence from the input sequence. In particular, a recurrent neural network can use some or all of the internal state of the network from a previous time step in computing an output at a current time step.

SUMMARY

This specification describes systems, methods, devices, and other techniques for processing input sequences with a controller neural network that has been augmented with a hierarchical external memory.

Some implementations of the subject matter described herein include an augmented neural network system for processing a sequence of system inputs to generate a sequence of system outputs. The system can include a controller neural network, a hierarchical external memory, and a memory access subsystem. The controller neural network may be a feedforward neural network or a recurrent neural network. In general, the controller neural network is configured to receive a neural network input at each of a series of time steps and to process the neural network input to generate a neural network output for the time step. The neural network output can include a memory key and, optionally, other data (e.g., a system output portion). The hierarchical external memory is distinct from the controller neural network and includes a set of memory nodes arranged as a binary tree. To provide an interface between the controller neural network and the external memory, the system includes a memory access subsystem that is configured to, for each of the series of time steps, perform one or more operations to generate a respective system output for the time step.

These and other implementations can optionally include one or more of the following features.

The operations that the memory access subsystem is configured to perform at each of the series of time steps can include traversing the binary tree to generate a path from a root memory node in the binary tree to a particular leaf memory node in the binary tree using the memory key, reading the data stored in the particular leaf memory node, and updating the data stored in the particular leaf memory node using the memory key.

Updating the data stored in the particular leaf memory node can include processing the data stored in the particular leaf memory node and the memory key using a write neural network to generate updated memory node data and writing the updated memory node data to the particular leaf memory node. The write neural network can be configured to process the data stored in the particular leaf memory node and the memory key to generate the updated memory node data.

The memory access subsystem can be further configured to, for each of the series of time steps, update the data stored in the memory nodes on the path other than the particular leaf memory node in reverse traversal order. The respective data stored in each parent memory nodes on the path can be updated in reverse traversal order by processing the updated data stored in the child node of the memory node that is on the path and the data stored in the child node that is not on the path using a join neural network to generate updated data for the parent node. The updated data for each parent node can then be written to the parent node using the memory access subsystem.

The memory access subsystem can be configured to traverse the binary tree of the hierarchical external memory using the memory key. The memory access subsystem can be configured to traverse the binary tree starting from the root node of the binary and determining a path to the particular leaf memory node. At each memory node along the path, the memory access subsystem can (i) process the data stored in the memory node and the memory key using a search neural network, wherein the search neural network is configured to process the data stored in the memory node and the memory key to generate a probability value p, (ii) follow a first branch from the memory node to add a new child node to the path with probability p, and (iii) follow a second branch from the memory to add a new child node to the path with probability 1−p.

The memory access subsystem can further be configured to initialize the data stored in the leaf memory nodes of the binary tree using the sequence of inputs or a sequence of system inputs from which the sequence of inputs were derived.

The memory access subsystem can be further configured to initialize the data stored in the memory nodes in the tree other than the leaf memory nodes in bottom-up order by, for each of the other nodes: (i) processing the updated data stored in the child nodes of the node using a join neural network, wherein the join neural network is configured to process data stored in one child node and data stored in another child node and to generate updated data for the parent node of the one child node and the other child node and (ii) writing the updated data to the node.

The system can further include one or more output layers. The output layers can be configured to, for each of the series of time steps, process the data read from the external memory for the time step to generate a system output for the time step.

The neural network output for each of the series of time steps can further include a system output portion, e.g., in addition to the memory key.

The memory access subsystem can be further configured to, for each of the series of time steps, provide an output derived from the system output portion as a system output for the time step.

The system can further include one or more output layers that are configured to, for each of the series of time steps, process the data read from the external memory and the system output portion for the time step to generate a system output for the time step.

The neural network input for each time step can be a respective system input from the sequence of system inputs.

The memory access subsystem can be further configured to, for each of the series of time steps, combine the data read form the external memory and a respective system input from the sequence of system inputs to generate a subsequent neural network input for a subsequent time step.

Some implementations of the subject described herein include a computer implemented method, e.g., a method for processing a sequence of inputs that includes a respective input at each of a series of time steps to generate a sequence of outputs that includes a respective output at each of the series of time steps. The method can be carried out by augmented neural network system that includes a controller neural network and a hierarchical external memory. The method can include obtaining the sequence of inputs and for each time step in the series of time steps, processing the respective input at the time step using a controller neural network to generate a memory key, identifying data stored in a hierarchical memory that is distinct from the controller neural network and includes a set of memory nodes arranged in a binary tree, and providing a respective output for the sequence of outputs at the time step using data stored in a particular leaf memory node of the binary tree. The system identifies the data stored in the particular leaf memory node by traversing the binary tree to generate a path from a root memory node in the binary tree to the particular leaf memory node in the binary tree using the memory key, and reading the data stored in the particular leaf memory node.

This specification also provides a computer program comprising machine readable instructions that when executed by computer apparatus controls it to perform the above method.

These and other implementations can optionally include one or more of the following features.

For each time step in the series of time steps, the system can update the data stored in the particular leaf memory node by processing the data currently stored in the particular leaf memory node and the memory key using a write neural network to generate updated memory node data. The system then writes the updated memory node data to the particular leaf memory node.

The system can process the sequence of inputs, or a sequence of system inputs from which the sequence of inputs is derived, using an embedding neural network to generate a sequence of embeddings that includes a respective embedding at each time step in the series of time steps. The system then initializes the data stored in the set of memory nodes of the binary tree using the sequence of embeddings.

The controller neural network can be a feedforward neural network or a recurrent neural network.

Some implementations of the subject matter described herein can, in certain instances, achieve one or more of the following advantages. First, by augmenting a controller neural network with an external memory, the capacity of the neural network system to account for long-range dependencies in input sequences may be extended, while still limiting the size (e.g., number of parameters) of the controller neural network. For example, an external memory can allow a feedforward neural network to generate an output at a given time step that is at least partially dependent on one or more inputs, outputs, or both, from preceding time steps. And while conventional recurrent neural networks, e.g., long-short term memory (LSTM) neural networks, that are not augmented with an external memory can maintain a hidden state as a form of internal memory, these networks generally do not scale well to larger internal memories as the number of parameters of the network tends to increase substantially (e.g., quadratically) with the size of the network's internal memory. In some implementations, by providing an external memory, the size of the memory can advantageously be made independent of the number of parameters of the controller neural network so that larger memories can be employed without unduly increasing the size of the controller neural network.

Second, memory access efficiency may be increased by structuring the external memory as a binary tree. In some implementations, accessing desired data stored in a hierarchical memory can be carried out with $\theta(\log(n))$ complexity, where n is the size of the memory (e.g., the number of nodes in the binary tree). Thus, memory access efficiency can be improved using a hierarchical memory, especially as the size of the memory increases.

Third, a neural network system augmented with an external memory can, in some implementations, generalize well to input sequences that are much longer than ones seen during training.

Additional advantages will be apparent to persons of ordinary skill in the art in view of the subject matter disclosed in the description herein, the figures, and the claims.

DETAILED DESCRIPTION

Figure 1:
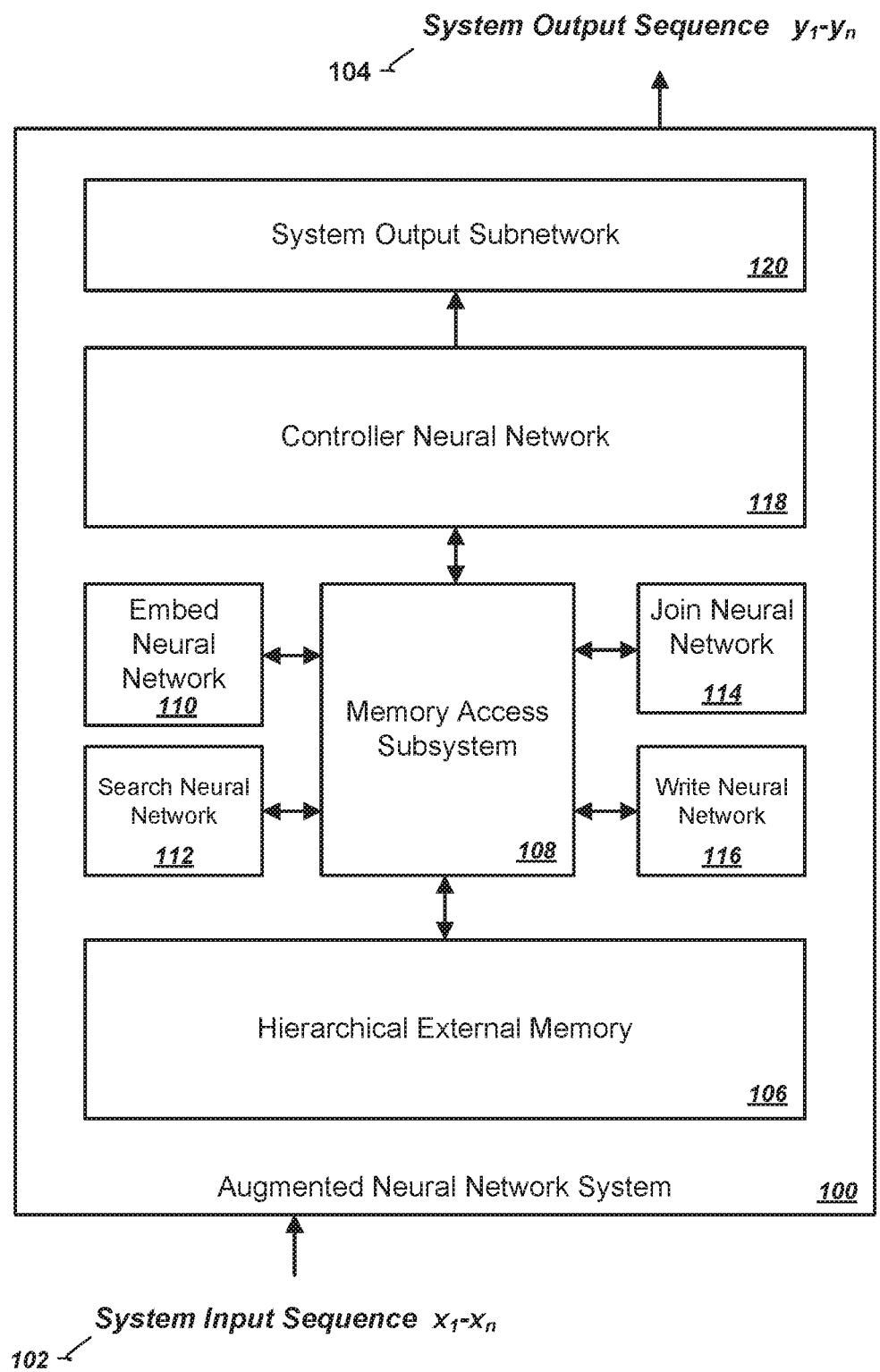
FIG. 1 is a block diagram of an example augmented neural network system that includes, among other components, a controller neural network and a hierarchical external memory.

FIG. 1 is a block diagram of an example augmented neural network system 100.

The system 100 is configured to process a system input sequence 102 and generate a system output sequence 104. In general, and as explained further below, the system 100 includes a controller neural network 118 and a hierarchical external memory 106 to augment the controller neural network 118. The memory 106 provides or extends an ability of the controller neural network 118 to generate outputs at a given time step that are at least partially influenced by the inputs or outputs at one or more preceding time steps. Moreover, as further explained below, the memory 106 may be arranged as a binary tree that allows efficient access to data stored in the tree's leaves. The memory 106 may store data that is used as input to the controller neural network, data from which a system output is derived, or both.

The system input sequence 102 includes a respective input at each time step in a series of time steps. Likewise, the system output sequence 104 includes a respective output at each time step in a series of time steps. Depending on the task that the system 100 is configured to perform, the input sequence 102 and output sequence 104 can represent any of various types of data. For example, if the system 100 has been trained to perform speech recognition, then each input in the input sequence 102 may represent a respective chunk of an audio signal characterizing an utterance that is to be transcribed to text, and each output in the output sequence 104 may represent a respective portion of a textual transcription of the utterance, e.g., a character, a word, or a phase. In another example, if the system 100 has been trained to translate text from one language to another, then each input in the input sequence 102 may be one or more words of text in a first language and each output in the output sequence 102 may be one or more words of text in a second language. In general, the system can be configured to receive any kind of digital data input and to generate any kind of score or classification output based on the input.

The system 100 may generally be implemented as computer programs on one or more computers in one or more locations. The system 100 includes a controller neural network 118 that has been augmented with hierarchical external memory 106. In some implementations, the memory 106 allows the controller neural network 118 to process inputs that include short-, mid-, and even long-range dependencies in input sequence 102 while limiting the overall size of the controller neural network 118 (e.g., limiting the number of parameters of the network 118).

The controller neural network 118 is configured to process a sequence of neural network inputs at each of a series of time steps to generate a neural network output at each time step. The output can include a memory key for the time step, and optionally additional data (e.g., a system output portion). In some implementations, the sequence of neural network inputs is the system input sequence 102 itself. In other implementations, the sequence of neural network inputs provided to the controller neural network 118 is derived at least in part from the system input sequence 102. For instance, the neural network input at a given time step may be generated by combining the respective system input at the given time step or a preceding time step and data read from the external memory 106 at the given time step or the preceding time step. The controller neural network 118 may be a feedforward neural network or a recurrent neural network, e.g., a long short-term memory (LSTM) neural network.

The system 100 can include a system output subnetwork 120. The system output subnetwork 120 is configured to generate a respective system output at each time step of the system output sequence 104. In some implementations, the system output subnetwork 120 is distinct from the controller neural network 118 and processes data independently of the controller neural network 118 to generate system outputs. In other implementations, the system output subnetwork 120 is arranged as one or more output layers of the controller neural network 118. For example, system output subnetwork 120 may be a softmax output layer of the controller neural network 118.

The controller neural network 118 is augmented with a hierarchical external memory 106. The external memory 106 includes a collection of memory cells (also referred to as "nodes") that are arranged as a binary tree. Each cell of the memory 106 is configured to store a respective set or item of data.

For further explanation of a binary tree of an external memory, reference is made to FIG. 2, which illustrates an example binary tree 200 that characterizes the contents of a hierarchical external memory, e.g., external memory 106. In this example, the binary tree 200 consists of fifteen individual memory cells 202$a$-$o$, arranged in a hierarchical fashion over four layers. The single memory cell 202$a$ located at the top of the tree 200 is a root memory cell, i.e., a memory cell that has no ancestors (e.g., has no parent memory cell). Other than the root memory cell 202$a$, every other cell 202$b$-$o$ in the binary tree 200 has one parent memory cell. The bottom-most layer of memory cells 202$h$-$o$ are leaf memory cells, i.e., memory cells that have no children. Other than the leaf memory cells 202$h$-$o$, every other cell 202$a$-$g$ has two child cells. For a given parent memory cell, its children can be identified respectively as a left child memory cell and a right child memory cell. As an example, the root memory cell 202$a$ has a left child memory cell 202$b$ and a right child memory cell 202$c$. Each memory cell 202$a$-$o$ in the binary tree 200 stores respective data, represented by the symbol $h_i$. The respective data stored in each memory cell may be a vector of real or complex values. As explained in further detail below, the data stored in the memory cells 202$a$-$o$ may be computed using outputs from controller neural network 118. In some implementations, data stored in a selected memory cell can be used as input to the controller neural network 118, or the input to the controller neural network 118 can be derived at least in part from data stored in a selected memory cell.

Referring again to FIG. 1, the neural network system 100 further includes a memory access subsystem 108. The memory access subsystem 108 provides an interface between the controller neural network 118 and the hierarchical external memory 106. For example, the memory access subsystem 108 may read a neural network output, e.g., a memory key, at a given time step and use the neural network output to query the external memory 106. In some implementations, the memory access subsystem 108 reads data from the external memory 106 and uses the read data to generate a neural network input for the controller neural network 118.

The memory access subsystem 108 interfaces with a set of models 110, 112, 114, and 116 to perform operations in the external memory 106. The models 110, 112, 114, and 116 can each be a neural network, e.g., an embed neural network 110, a search neural network 112, a join neural network 114, and a write neural network 116.

Figure 2A:
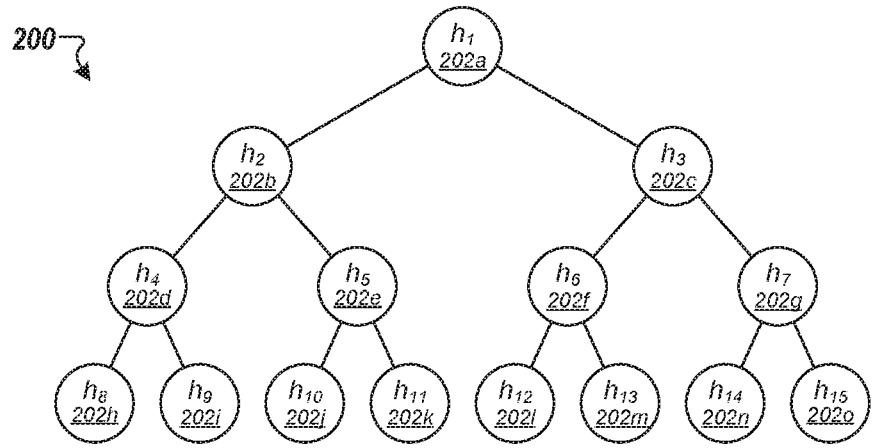
FIG. 2A depicts a representation of a hierarchical external memory in the form of a binary tree.
Figure 2B:
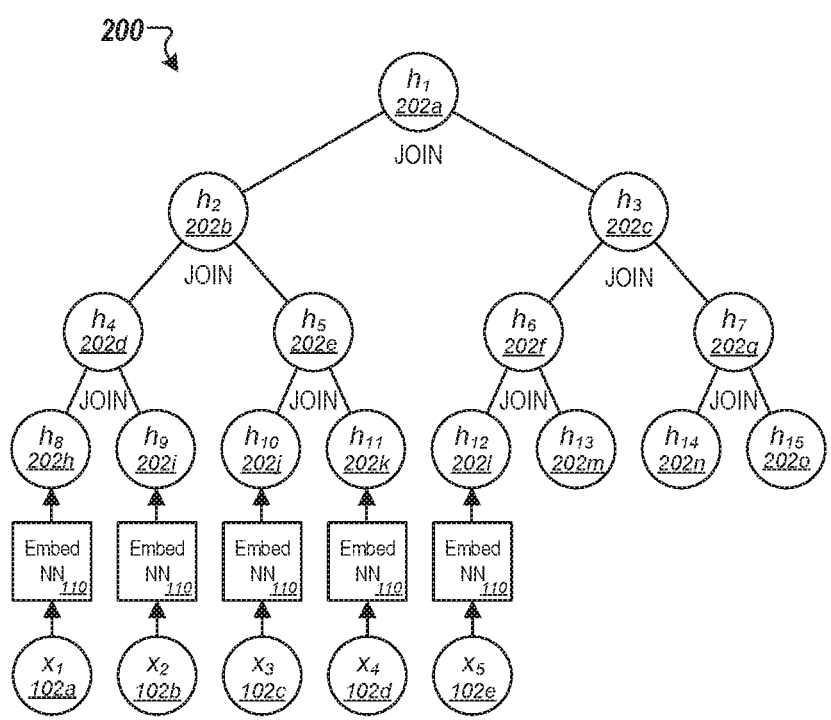
FIGS. 2B-2D depict various operations that may be performed on data stored in memory cells of the binary tree.

The embed neural network 110 is a feedforward neural network configured to process an input to generate an embedding output. The embed neural network 110 may include multilayer perceptrons with rectified linear unit (ReLU) activation functions in all neurons. In some implementations, the memory access subsystem 108 calls on the embed neural network 110 to generate embeddings from the system input sequence 102. The subsystem 108 then initializes the leaf memory cells in external memory 106 using the embeddings generated by the embed neural network 110. FIG. 2B, for example, shows how the leaf memory cells 202$h$-1 in binary tree 200 are initialized by generating a respective embedding for each system input $x_1$-$x_5$ in the system input sequence 102. For instance, the data $h_8$ stored in leaf memory cell 202$h$ is initialized with an embedding vector that the embed neural network 110 generated by processing system input 102$a$. The remaining leafs in the binary tree 200 are initialized in a similar manner by processing subsequent inputs from the system input sequence 102 using the embed neural network 110. For any leaf memory cells that are not matched to an input from the system input sequence 102 (e.g., cells 202$m$-$o$) due to the number of leaf memory cells exceeding the number of inputs in system input sequence 102, these cells may be initialized with a default value, e.g., zero.

The search neural network 112 is a feedforward neural network that processes an input having a first portion and a second portion to generate a search output that represents a probability p. The search neural network 112 may include multilayer perceptrons with rectified linear unit (ReLU) activation functions in all neurons except the output layer of the network 112, which may use sigmoid activation functions to ensure that the output may be interpreted as a probability. The memory subsystem 108 may call on the search neural network to traverse a path through the binary tree of external memory 106 from a root memory cell to a particular leaf memory cell.

Figure 2C:
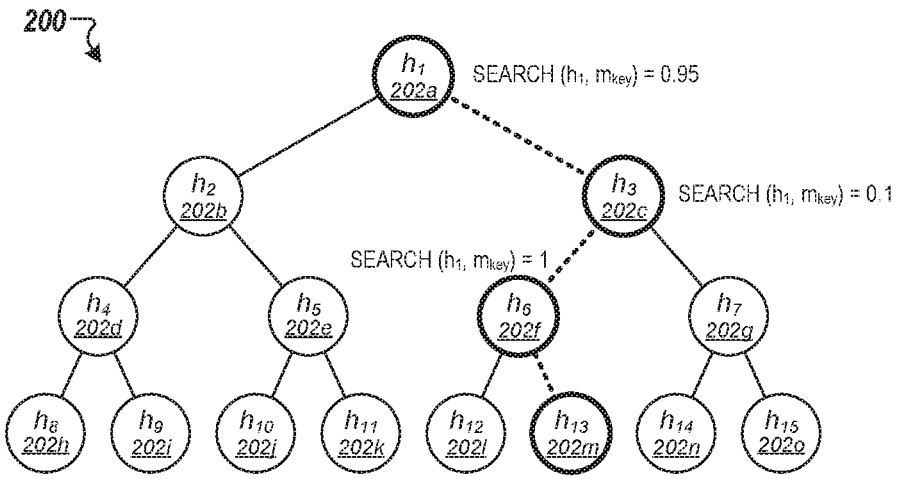

For example, FIG. 2C shows how the memory access subsystem 108 may traverse a path (indicated by dashed lines) from root memory cell 202a to leaf memory cell 202m in binary tree 200. In some implementations, to traverse the path, the memory access subsystem 108 starts at the root memory cell 202a and calls on the search neural network 112 to generate a probability p based on the data $h_1$ stored in the root memory cell 202a and a memory key generated by the controller neural network 118. The data $h_1$ and the memory key may be combined, e.g., concatenated, by the memory access subsystem 108 and provided as input to the search neural network 112 to generate probability p. The memory access subsystem 108 then assigns the probability p to the branch between the root memory cell 202a and its right child cell 202c, and assigns the probability 1−p to the branch between the root memory cell 202a and its left child cell 202b. In other implementations, the probability p is assigned to the branch between the parent cell and the left child cell, while the probability 1−p is assigned to the branch between the parent cell and the right child cell. The memory subsystem 108 repeats these operations for each parent cell in the binary tree 200, e.g., by combining the respective data stored in the parent cell with the memory key to generate a search neural network input, processing the input with the search neural network 112 to generate a probability p, assigning the probability p to the branch between the parent cell and the right child cell, and assigning the probability 1−p to the branch between the parent cell and the left child cell. The memory access subsystem 108 then computes a respective path probability for the respective path from the root memory cell 202a to each of the leaf memory cells 202h-o by multiplying the probabilities assigned to each branch in the respective path. A particular leaf cell can then be selected by the memory access subsystem 108 based on the respective path probabilities of the leaf cells. In some implementations, the subsystem 108 selects the particular leaf cell that has the highest path probability. For example, the path probability for leaf cell 202m in FIG. 2C can be determined based on the probabilities assigned between cells 202a and 202c, cells 202c and 202f, and cells 202f and 202m. If the path probability for leaf cell 202m is greater than the path probabilities of the other leaf cells, then attention may be given to leaf cell 202m and the data $h_{13}$ stored by leaf cell 202m may be accessed, e.g., for use in generating a system output at a given time step.

In other implementations, the memory access subsystem 108 selects a particular leaf memory cell by following a path from the root memory cell of the binary tree to the particular leaf memory cell, where the path is defined to follow, at each parent cell, the respective branch from the parent cell to either the left child cell or the right child cell that is assigned the higher probability. By way of example, as shown in FIG. 2C, the traversal procedure may start at root memory cell 202a. Using the search neural network 112, the probability p=0.95 is assigned to the right branch extending to right child node 202c and the probability 0.05 (i.e., 1−p) is assigned to the left branch extending to left child node 202b. Being as the probability assigned to the right branch is greater than the probability assigned to the left branch, the memory access subsystem 108 extends the path along the right branch from root cell 202a to right child cell 202c. The subsystem 108 repeats these operations at each memory cell until a leaf memory cell is reached. For example, the path in FIG. 2C runs from cell 202a to cell 202c to cell 202f, and finally to leaf memory cell 202m.

The join neural network 114 is a feedforward neural network configured to generate a join output by processing an input having a first portion and a second portion. The join neural network 114 may include multilayer perceptrons with rectified linear unit (ReLU) activation functions in all neurons. In some implementations, the memory access subsystem 108 calls on the join neural network 114 to perform a join operation on a pair of sibling cells in external memory 106. In particular, the memory access subsystem 108 obtains the data stored in the left sibling cell as the first portion of the input to the join neural network 114 and obtains the data stored in the right sibling cell as the second portion of the input to the join neural network 114. The join neural network 114 then generates a join output by processing the first and second portions of the input. The memory subsystem 108 then writes the join output to the parent cell of the pair of sibling cells.

Figure 2D:
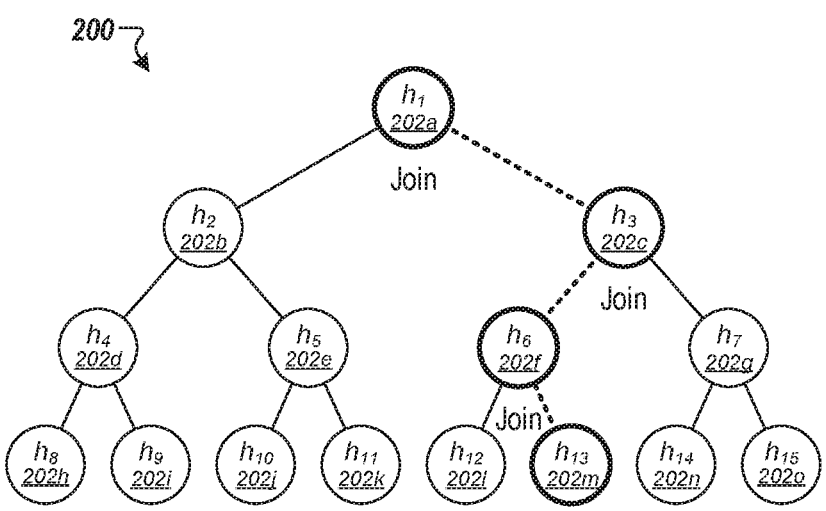

FIGS. 2B and 2D illustrate two distinct contexts in which the memory access subsystem 108 may perform join operations in binary tree 200 using the join neural network 114. First, FIG. 2B shows how the memory access subsystem 108 uses join operations to initialize memory cells in the binary tree 200. After the leaf memory cells 202h-o have been initialized with embeddings generated by the embed neural network 110, the remaining memory cells 202a-g can be initialized using join operations defined by the join neural network 114. For each pair of sibling cells that have been initialized in the binary 200, the memory subsystem 108 initializes the respective parent memory cell by reading the initialized data stored in the sibling cells, providing the initialized data that was read from the sibling cells as input to the join neural network 114, receiving a join output generated by the join neural network 114, and then writing the join output to the parent cell. The join operation is repeatedly performed in the binary tree 200 until all of the memory cells have been initialized.

FIG. 2D depicts the second context in which the memory access subsystem 108 uses the join neural 114 to perform join operations in the binary tree 200. In particular, the memory access subsystem 108 may perform join operations in the binary tree 200 to update the data stored in only those cells along a path from the root memory cell 202a to a particular leaf memory cell, e.g., memory cell 202m. For example, as discussed below with respect to FIGS. 3A-3B, at each time step in processing the sequence of system inputs 102, the memory access subsystem 108 may update one of the leaf memory cells in a binary tree. Also during that time step, the memory subsystem 108 may update the respective data stored in each ancestor cell of the updated leaf cell. For example, if new data is written to leaf memory cell 202m, the memory subsystem 208 may then update the ancestors of cell 202m in reverse traversal order by writing a first join output of neural network 114 to memory cell 202f, writing a second join output of neural network 114 to memory cell 202c, and writing a third join output of neural network 114 to memory cell 202a. The neural network 114 processes the data $h_{12}$ of cell 202l and the data $h_{13}$ of cell 202m to generate the first join output, processes the data $h_6$ of cell 202*f* and the data $h_7$ of cell 202*g* to generate the second join output, and processes the data $h_2$ of cell 202*b* and the data $h_3$ of cell 202*c* to generate the third join output.

The system 100 further includes a write neural network 116. The write neural network 116 is a feedforward neural network configured to process an input having a first portion and a second portion to generate a write output. The parameters of the write neural network 116 define a write operation that transforms the input to the network 116 to the write output that the network 116 generates. The write neural network 116 may include multilayer perceptrons with rectified linear unit (ReLU) activation functions and, optionally, sigmoid activation functions in the output layer. In some implementations, the memory access subsystem 108 uses the write neural network 116 to update data stored in a selected leaf memory cell in the binary tree of external memory 106, e.g., binary tree 200. To update the data stored in a leaf memory cell, the memory access subsystem 108 reads the current data stored in the leaf memory cell and identifies a memory key generated by the controller neural network 118 at a given time step. The current data of the leaf memory cell is provided to the write neural network 116 as the first portion of the input. The memory key is provided to the write neural network 116 as the second portion of the input. The write neural network 116 processes the input to generate a write output, which the memory access subsystem 308 then writes to the leaf memory cell as updated memory cell data.

Figure 3A:
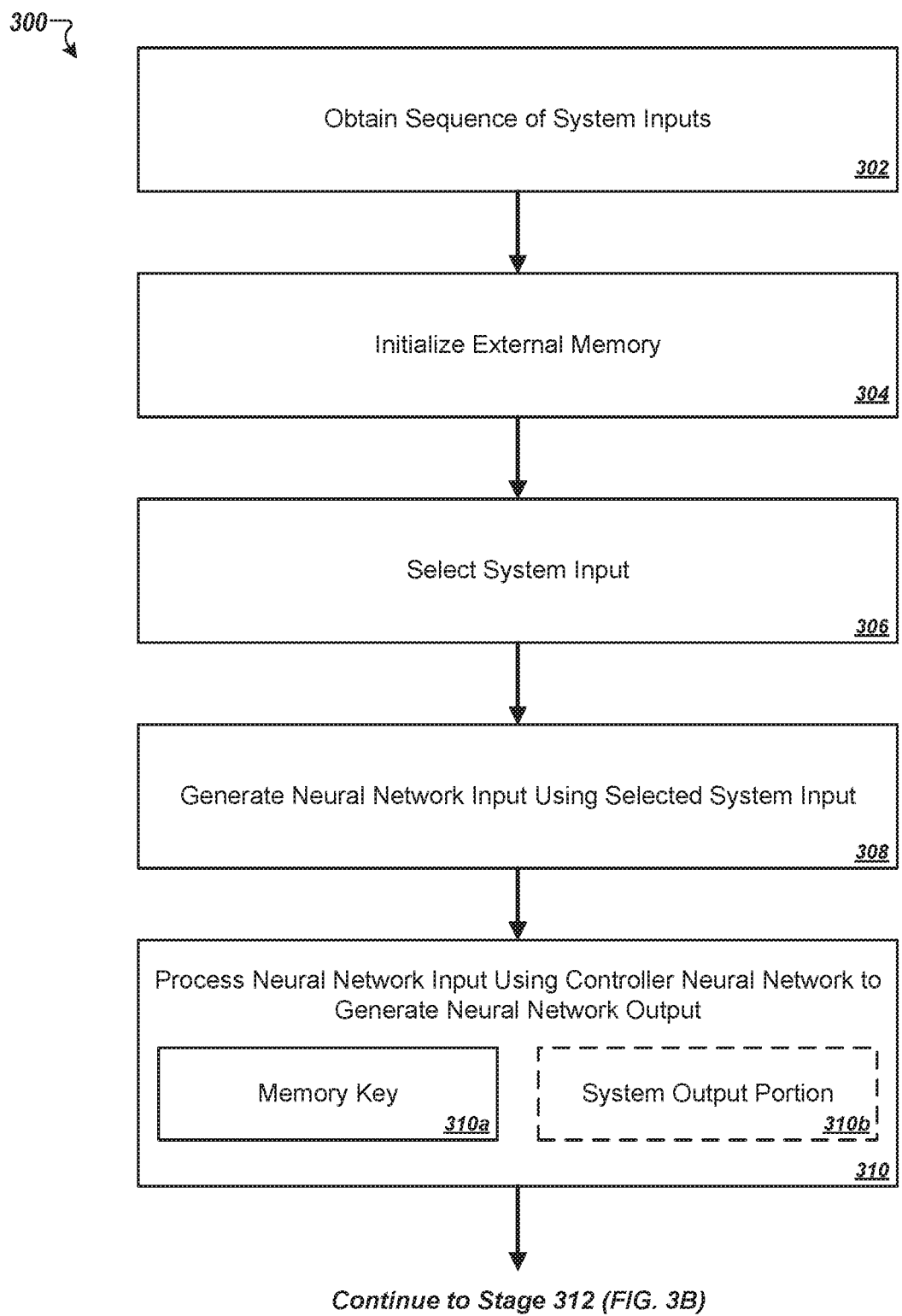
FIGS. 3A and 3B are flowcharts of an example process for generating a sequence of output from a sequence of inputs using an augmented neural network system having a controller neural network and a hierarchical external memory.
Figure 3B:
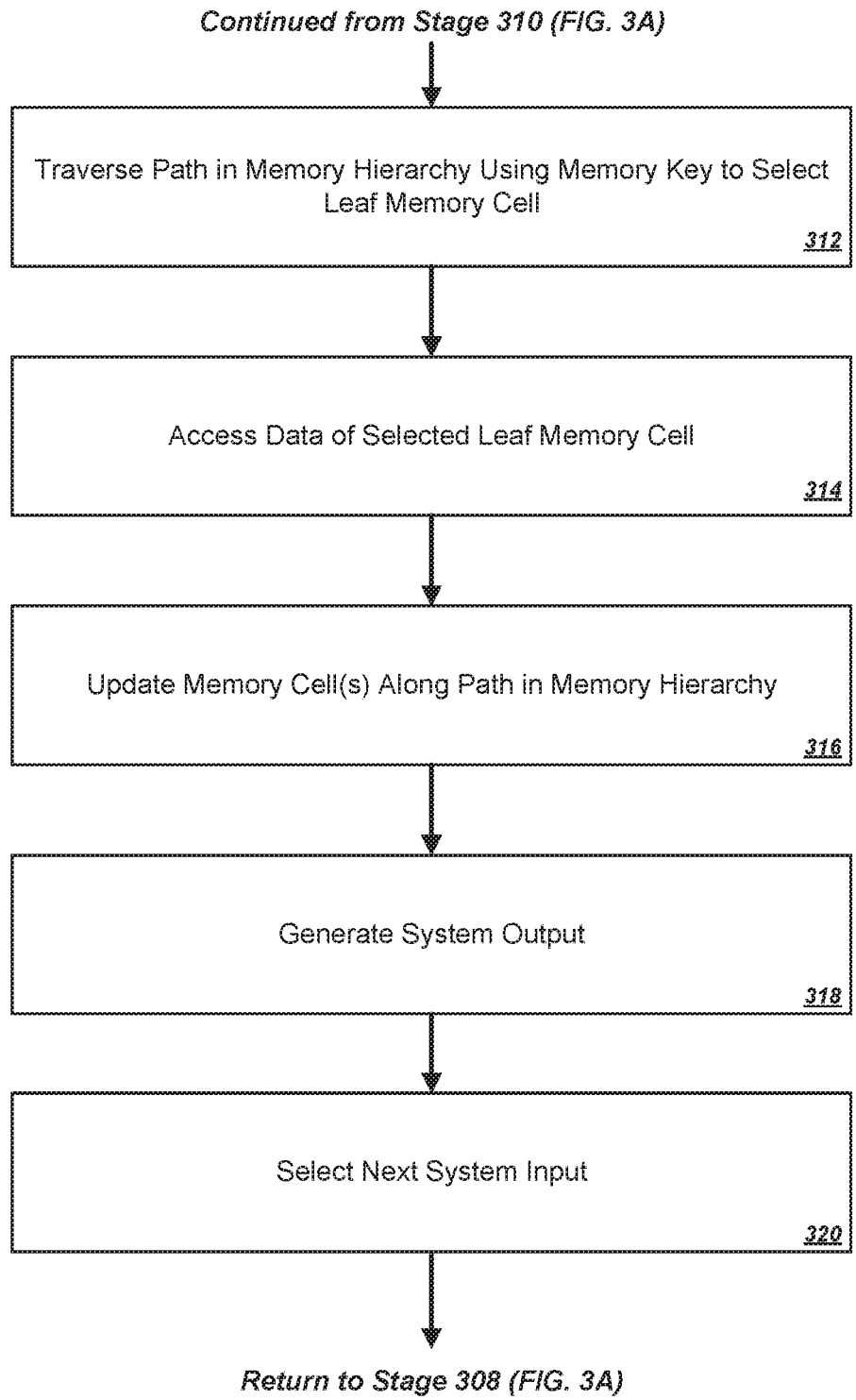

FIGS. 3A-3B depict a flowchart of an example process 300 for processing a sequence of system inputs to generate a sequence of system outputs. The process 300 may be performed by an augmented neural network system, e.g., augmented neural network system 100.

The process 300 begins at stage 302 when the augmented neural network system 100 obtains a sequence of system inputs. The sequence of system inputs includes a respective input at each of a series of time steps. Depending on the task that the system is configured to perform, the sequence of system inputs received by the system and the sequence of system outputs generated by the system can represent any of various types of data.

For example, if the inputs to the system are images or features that have been extracted from images, the output generated by the system for a given image may be scores for each of a set of object categories, with each score representing an estimated likelihood that the image contains an image of an object belonging to the category.

As another example, if the inputs to the system are Internet resources (e.g., web pages), documents, or portions of documents or features extracted from Internet resources, documents, or portions of documents, the output generated by the system for a given Internet resource, document, or portion of a document may be a score for each of a set of topics, with each score representing an estimated likelihood that the Internet resource, document, or document portion is about the topic.

As another example, if the inputs to the system are features of a personalized recommendation for a user, e.g., features characterizing the context for the recommendation, e.g., features characterizing previous actions taken by the user, the output generated by the system may be a score for each of a set of content items, with each score representing an estimated likelihood that the user will respond favorably to being recommended the content item. In some of these examples, the system is part of a reinforcement learning system that provides content recommendations to users.

As another example, if the input to the system is text in one language, the output generated by the system may be a score for each of a set of pieces of text in another language, with each score representing an estimated likelihood that the piece of text in the other language is a proper translation of the input text into the other language.

As another example, if the input to the system is features of a spoken utterance, the output generated by the system may be a score for each of a set of pieces of text, each score representing an estimated likelihood that the piece of text is the correct transcription for the utterance.

As another example, if the inputs to the system are images, the output generated by the system may be a score for each of a set of pieces of text, each score representing an estimated likelihood that the piece of text is text that is present in the input image.

As another example, if the inputs to the system are pieces of code from a computer program, the output generated by the system may identify a predicted output of the computer program.

At stage 304, the system initializes a hierarchical external memory, e.g., hierarchical external memory 106. The external memory may include a collection of memory cells that are arranged as a binary tree, e.g., binary tree 200. The system initializes the external memory by writing initial data to each of the memory cells of the binary tree. In some implementations, the system first initializes the leaf memory cells of the tree based on the sequence of system inputs. For example, an embed neural network, e.g., embed neural network 110 may generate an embedding of each input in the system input sequence. A memory access subsystem, e.g., memory access subsystem 108, of the system may then write a respective embedding to each of the leaf memory cells in the binary tree. The binary tree generally has at least as many leaf memory cells as inputs in the system input sequence. If the tree has more leaves than the number of inputs in the system input sequence, then any leaf cell which is not initialized with an embedding may be initialized to zero or to another default value. Once the leaf memory cells are initialized, the system may then initialize higher-order memory cells in the tree using join operations. For each pair of sibling cells that have been initialized, the system uses a join neural network, e.g., join neural network 114, to generate a join output and writes the join output to the respective parent cell of the siblings. As such, each parent cell is initialized until all the memory cells in the tree have been initialized.

At stage 306, the system selects the respective input of the system input sequence at a first time step of the input sequence.

At stage 308, the system generates a neural network input using the selected system input. The neural network input is the input that is provided for processing to a controller neural network of the system, e.g., controller neural network 118. In some implementations, the system input at a current time step is used as the neural network input at that time step. In other implementations, the neural network input at a current time step is derived from (i) data read from a particular leaf memory cell of the external memory at a preceding time step and (ii) a respective system input from the system input sequence at the current time step or the preceding time step. For example, the memory access subsystem may combine the data read from the particular leaf memory cell with the respective system input to generate the neural network input for the current time step. In these implementations, for the first time step, the system uses placeholder data as the data read at the preceding time step.

At stage 310, the controller neural network processes the neural network input at the current time step to generate a neural network output for the time step. The neural network output includes a memory key 310a, which is at least a portion of the neural network output that the system uses to perform search and write operations in the hierarchical external memory. In some implementations, the neural network output includes a second portion in addition to the memory key 310a. The second portion is referred to herein as the system output portion, which is used to generate a system output in some implementations.

At stage 312, the system traverses a path through the binary tree of the external memory to select a particular leaf memory cell. In some implementations, the system uses a search neural network, e.g., search neural network 112, to traverse the path through the tree. Starting at the root memory cell of the binary tree, and at each of at least a subset of the descendant memory cells of the root cell, the system processes the memory key 310a and the data stored in the memory cell to generate a probability p. The probability p is assigned to the branch from the parent memory cell to the right sibling cell, i.e., the sibling cell located to the right of the parent cell in the binary tree. The probability 1−p is assigned to the branch from the parent memory cell to the left sibling cell, i.e., the sibling cell located to the left of the parent cell in the binary tree. The system then follows a path from the root memory cell to one of the leaf memory cells based on the probabilities assigned to the tree's branches. In some implementations, the system assigns a probability to every branch in the tree and selects a path to a particular leaf memory cell based on the cumulative probabilities of the respective path to each leaf memory cell. The system may select a path (and the leaf memory cell at the terminal end of the path) that has the highest cumulative probability. In other implementations, the system determines a path by starting from the root memory cell and moving down the tree to leaf memory cell, evaluating at each cell whether to proceed to the left or right child cell based on the probabilities assigned to their respective branches. For example, starting at the root cell, the system may determine to follow a path to the right child cell if the branch assigned to the right child cell has a greater probability then than the branch assigned to the left child cell. The system repeats these operations at each memory cell until arriving at a leaf memory cell.

At stage 314, the memory access subsystem reads the data stored in the selected leaf memory cell.

At stage 316, the system updates the data stored in the selected leaf memory cell and, optionally, updates the data stored in each ancestor memory cell of the selected leaf memory cell. To update the data stored in the selected leaf memory cell, the current data stored in the selected leaf memory cell and the current memory key 310a are provided as inputs to a write neural network, e.g., write neural network 116. The write neural network 116 processes the inputs and generates an output that the memory access subsystem then writes to selected leaf memory cell as updated memory data. To update the data stored in the ancestor memory cells, the system uses a join neural network, e.g., join neural network 114, to generate an output for each memory cell that is an ancestor of the selected leaf memory cell by processing the respective data stored in the memory cell's children cells. After updating the leaf memory cell, the ancestor cells are updated in the reverse order from which the cells were identified while traversing the path from the root memory cell to the leaf memory cell. Accordingly, each ancestor cell is updated only after updated data for its children cells have been determined.

At stage 318, the system generates a system output for the current time step. The system output may be generated by a system output subnetwork of the system, e.g., system output subnetwork 120. Depending on the particular implementation of the system, the system output can take different forms. In some implementations, the system provides the system output portion of the controller neural network's output at the time step, or an output derived from the system output portion, as the system output for the time step. In other implementations, the system provides the data read from the selected leaf memory cell, or an output derived from the data read from the selected leaf memory cell, as the system output for the time step. For example, the data read from the selected leaf memory cell (whether alone or with other data) can be processed by the system output subnetwork 120 to generate the system output for the time step. In yet other implementations, the system output subnetwork processes (i) the system output portion of the controller neural network's output at the time step and (ii) the data read from the selected leaf memory cell at the time step, to generate the system output for the time step.

At stage 320, the system selects the input at the next time step of the system input sequence and returns to stage 312, again performing the operations described with respect to stages 308-318 using the selected input to generate the next system output in a system output sequence. These stages 312-318 can be repeated for each input in the system input sequence until the end of the system input sequence, or until another terminating condition is detected.

In general, because the augmented neural network system has been described as using a "hard" attention mechanism in which data is read at each time step from a particular leaf memory cell, the memory access process is generally not a differentiable operation. Accordingly, a training system can may train aspects of the augmented neural network using a reinforcement learning technique such as the REINFORCE algorithm described in Williams, Ronald J. *Simple Statistical Gradient-Following Algorithms for Connectionist Reinforcement Learning*, Machine Learning, 8(3-4):229-256, 1992. For example, the controller neural network, embed neural network, search neural network, join neural network, and write neural network may be trained together using a reinforcement learning technique to maximize a received return. In some implementations, the received return can be modeled as the log-probability log p(y|A, x, θ), where y represents a system output sequence, x represents a corresponding system input sequence, θ represents the parameters of the model (e.g., the parameters of the controller, join, embed, search, and write neural networks), and A represents the sequence of all decisions whether to proceed left or right in traversing a binary memory tree during the whole execution of the model.

While the foregoing description describes that the memory access subsystem accesses and writes to memory stochastically, i.e., uses the memory key to read from and write to only one of the leaf cells at a given time step, in some other implementations, the memory access subsystem reads from and writes to all of the leaf cells in the same time step. In particular, the system can traverse each possible path to a given leaf cell using the memory key and determine a weight for the leaf cell based on the likelihood that the paths to the leaf cell are the correct path through the binary tree given the memory key. The system can then combine the data read from each of the leaf memory cells in accordance with their weights to generate the read data for the time step.

The system can also update the data in a given leaf cell by interpolating between the updated data determined for the leaf cell and the data currently stored in the leaf cell in accordance with the weight for the leaf cell, and the join operation can be performed to generate updates to the non-leaf cells in accordance with the weight for children cells.

For these implementations that use a soft attention mechanism where the memory access process is differentiable, the augmented neural network system may be trained using conventional machine-learning techniques, such as stochastic gradient descent with backpropagation through time. For example, the training system may train one or more neural networks of the system using training data that includes a training input and training target output. The training system provides each training input to the neural networks, and the neural networks in turn process the training input to generate an estimated output. The training system then computes an error between the target training output and the estimated output, and uses the error to adjust values of the parameters of the neural networks to reduce the error. For example, the training system can backpropagate gradients to adjust current values of the parameters of the neural network system to optimize a loss function.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system for processing a sequence of system inputs to generate a sequence of system outputs, the system comprising one or more computers configured to implement:
    a controller neural network that receives a neural network input at each of a plurality of time steps and processes the neural network input to generate a neural network output for the time step, wherein each neural network output includes a memory key;
    a hierarchical external memory comprising a plurality of memory nodes arranged as a binary tree; and
    a memory access subsystem that, for each of the plurality of time steps:
        traverses the binary tree to select a particular leaf memory node of a plurality of leaf memory nodes in the binary tree, wherein the particular leaf memory node is selected based on probability values calculated at each ancestor node along a path from a root memory node of the binary tree to the particular leaf memory node, wherein the probability value calculated at each ancestor node is based on data currently stored in the ancestor node and the memory key,
        reads data currently stored in the particular leaf memory node, and
        updates the data currently stored in the particular leaf memory node using the memory key.

2. The system of claim 1, wherein updating the data currently stored in the particular leaf memory node comprises:
    processing the data currently stored in the particular leaf memory node and the memory key using a write neural network, wherein the write neural network is configured to process the data stored in the particular leaf memory node and the memory key to generate updated memory node data; and
    writing the updated memory node data to the particular leaf memory node.

3. The system of claim 2, wherein the memory access subsystem is further configured to, for each of the plurality of time steps:
    update the data currently stored in the memory nodes on the path other than the particular leaf memory node in reverse traversal order by, for each of the other nodes:
        processing the updated data stored in the child node of the node that is on the path and the data stored in the child node that is not on the path using a join neural network, wherein the join neural network is configured to process data stored in one child node and data stored in another child node and to generate updated data for the parent node of the one child node and the other child node; and
        writing the updated data to the node.

4. The system of claim 3, wherein the join neural network comprises a multilayer perceptron.

5. The system of claim 2, wherein the write neural network comprises a multilayer perceptron.

6. The system of claim 1, further comprising a search neural network configured to process the probability value calculated at each ancestor node, wherein the probability value calculated at each ancestor node represents a likelihood that the path extends through a particular child node of the ancestor node.

7. The system of claim 6, wherein the search neural network comprises a multilayer perceptron.

8. The system of claim 1, wherein the memory access subsystem is further configured to:
  initialize data stored in the plurality of leaf memory nodes of the binary tree using the sequence of system inputs.

9. The system of claim 8, wherein the memory access subsystem is further configured to:
  initialize the data stored in the memory nodes in the tree other than the leaf memory nodes in bottom up order by, for each of the other nodes:
    processing the updated data stored in the child nodes of the node using a join neural network, wherein the join neural network is configured to process data stored in one child node and data stored in another child node and to generate updated data for the parent node of the one child node and the other child node; and
    writing the updated data to the node.

10. The system of claim 1, wherein the system is further configured to, for each of the plurality of time steps:
  process the data read from the external memory for the time step to generate a system output for the time step.

11. The system of claim 1, wherein the neural network output for each of the plurality of time steps further includes a system output portion.

12. The system of claim 11, wherein the memory access subsystem is further configured to, for each of the plurality of time steps, provide an output derived from the system output portion as a system output for the time step.

13. The system of claim 11, wherein the system is further configured to, for each of the plurality of time steps:
  process the data read from the external memory and the system output portion for the time step to generate a system output for the time step.

14. The system of claim 1, wherein the neural network input for each time step is a respective system input from the sequence of system inputs.

15. The system of claim 1, wherein the memory access subsystem is further configured to, for each of the plurality of time steps:
  combine the data read from the external memory and a respective system input from the sequence of system inputs to generate a subsequent neural network input for a subsequent time step.

16. The system of claim 1, wherein the controller neural network is a feedforward neural network.

17. A method for processing a sequence of inputs that includes a respective input at each of a plurality of time steps to generate a sequence of outputs that includes a respective output at each of the plurality of time steps, the method performed by a system of one or more computers and comprising:
  obtaining the sequence of inputs;
  for each time step in the plurality of time steps:
    processing the respective input at the time step using a controller neural network to generate a memory key;
    identifying data stored in a hierarchical memory that is distinct from the controller neural network and includes a plurality of memory nodes arranged in a binary tree, wherein identifying the data includes:
      traversing the binary tree to select a particular leaf memory node of a plurality of leaf memory nodes in the binary tree, wherein the particular leaf memory node is selected based on probability values calculated at each ancestor node along a path from a root memory node of the binary tree to the particular leaf memory node, wherein the probability value calculated at each ancestor node is based on data currently stored in the ancestor node and the memory key, and
    providing a respective output for the sequence of outputs at the time step using the data stored in the particular leaf memory node.

18. The method of claim 17, further comprising for each time step in the plurality of time steps:
  updating the data currently stored in the particular leaf memory node by processing the data currently stored in the particular leaf memory node and the memory key using a write neural network to generate updated memory node data; and
  writing the updated memory node data to the particular leaf memory node.

19. The method of claim 17, further comprising:
  processing the sequence of inputs, or a sequence of system inputs from which the sequence of inputs is derived, using an embedding neural network to generate a sequence of embeddings that includes a respective embedding at each time step in the plurality of time steps; and
  initializing the data stored in the plurality of memory nodes of the binary tree using the sequence of embeddings.

20. The method of claim 19, wherein the embedding neural network comprises a multilayer perceptron.

21. The method of claim 17, wherein the controller neural network is one of a feedforward neural network or a recurrent neural network.

22. One or more non-transitory computer-storage media encoded with instructions that, when executed by one or more computers, cause the one or more computers to perform operations for processing a sequence of inputs that includes a respective input at each of a plurality of time steps to generate a sequence of outputs that includes a respective output at each of the plurality of time steps, the operations comprising:
  obtaining the sequence of inputs;
  for each time step in the plurality of time steps:
    processing the respective input at the time step using a controller neural network to generate a memory key;
    identifying data stored in a hierarchical memory that is distinct from the controller neural network and includes a plurality of memory nodes arranged in a binary tree, wherein identifying the data includes:
      (i) traversing the binary tree to select a particular leaf memory node of a plurality of leaf memory nodes in the binary tree, wherein the particular leaf memory node is selected based on probability values calculated at each ancestor node along a path from a root memory node of the binary tree to the particular leaf memory node, wherein the probability value calculated at each ancestor node is based on data currently stored in the ancestor node and the memory key, and (ii) reading data stored in the particular leaf memory node; and providing a respective output for the sequence of outputs at the time step using the data stored in the particular leaf memory node.

23. The one or more non-transitory computer-storage media of claim 22, wherein the operations further comprise, for each time step in the plurality of time steps:

updating the data currently stored in the particular leaf memory node by processing the data currently stored in the particular leaf memory node and the memory key using a write neural network to generate updated memory node data; and writing the updated memory node data to the particular leaf memory node.

24. The system of claim 1, wherein the controller neural network comprises one or more layers of nonlinear units that operate on inputs according to nonlinear functions to generate an output.

* * * * *